United States Patent [19]

Patton et al.

[11] Patent Number: 4,491,713
[45] Date of Patent: Jan. 1, 1985

[54] POWER AND SENSING CABLE ARRANGEMENT FOR ELECTRICAL DISCHARGE MACHINING ASSEMBLY

[75] Inventors: Roy D. Patton; Robert C. Brown, both of Mooresville, N.C.

[73] Assignee: Colt Industries Operating Corp., New York, N.Y.

[21] Appl. No.: 315,745

[22] Filed: Oct. 28, 1981

[51] Int. Cl.³ .................. B23P 1/02; H01B 9/00
[52] U.S. Cl. ................... 219/69 R; 174/107; 174/115; 219/69 C
[58] Field of Search .............. 174/115, 107, 36; 219/137.9, 69 R, 69 C

[56] References Cited

U.S. PATENT DOCUMENTS 4,367,390 1/1983 Balleys et al. ............. 219/69 C

FOREIGN PATENT DOCUMENTS 854971 4/1940 France .................... 174/36
846529 8/1960 United Kingdom ........... 174/36

Primary Examiner—C. L. Albritton
Assistant Examiner—Alfred S. Keve
Attorney, Agent, or Firm—Harry R. Dumont

[57] ABSTRACT

A combined power and sensing cable for inter-connecting an EDM power supply and machine tool including a pair of power conducting leads (14,16), each having a non-conducting sleeve (18a, 20a) and a plurality of individual conductors (20) inside each such sleeve. A braided shield sleeve (22) encloses both the power leads. An external insulating jacket (12) encloses the braided shield sleeve (22). A plurality of sensing and control leads (28) are enclosed by a second braided shield (26) which in turn is enclosed by its insulating sleeve (24). The sensing and control leads (28) are aligned substantially parallel to the power conductor leads (14,16) intermediate their respective braided shield (22) and the external insulating jacket (12).

4 Claims, 2 Drawing Figures

POWER AND SENSING CABLE ARRANGEMENT FOR ELECTRICAL DISCHARGE MACHINING ASSEMBLY

TECHNICAL FIELD

This invention relates to a combined power conducting and sensing lead cable for a electrical discharge machining assembly.

BACKGROUND ART

The present invention is used in conjunction with electrical machining in a typical machining assembly that includes both a power supply and a machine tool. The power supply provides machining power pulses over a very broad range of frequencies from one or two hundred HZ. as high as 200 KHZ. Also in the EDM operation sensing and control leads are used to control servo operation with regard to the machining tool. The machine tool normally includes an electrode tool mounted on a ram for vertical movement toward and away from a workpiece. The workpiece is mounted in a workpan which is filled with a dielectric fluid so that the machine gap between electrode tool and workpiece is submerged under coolant. In some cases, a circulation system is included for providing pressurized flow of dielectric coolant through the gap. The power supply necessarily is positioned with a physical spacing from the associated machine tool or tools.

In the precise control of the machine tool during an EDM machining operation, gap voltage may be sensed or other gap parameters used to provide a signal back to the power supply to control such characteristics as machining power on-time or off-time or in some cases where gap short circuit occurs to provide an actual interuption of machining power pulses with power supply. Thus to provide stable machining and cutting, the construction of the cable has become more and more important particularly where high frequency cutting is used such as in finishing operations. The present invention is thus particularly and uniquely adapted for a connecting cable for EDM between a power supply and a machine tool.

DISCLOSURE OF THE INVENTION

The cable constructed in accordance with the present invention includes a novel and separate shielding arrangement for both sensing leads and for power conducting leads. Separate braided shields are used to enclose the power leads and the grouped sensing leads. The sensing leads preferably joined in a twisted pair arrangement within their respective shield. An insulating and resilient external jacket or sleeve is used to tightly hold the power leads together throughout their length to provide for a fairly constant spacing between the power leads and thus more or less uniform capacitance throughout the length of the cable. This results in an extremely low line impedance and very low inter lead capacitance without going to the expense and limitations of a copper bus-bar connector. The cable according to the present invention thus both stabilizes the cutting and servo operation and operates in a most efficient manner to deliver almost all the power available to the spark gap.

BRIEF DESCRIPTION OF THE DRAWINGS

The present invention will now be described with reference to the accompanying specification and to the drawings in which like numerals are used to refer to like parts in the several views and wherein.

BEST MODE OF CARRYING OUT THE INVENTION

Figure 1:
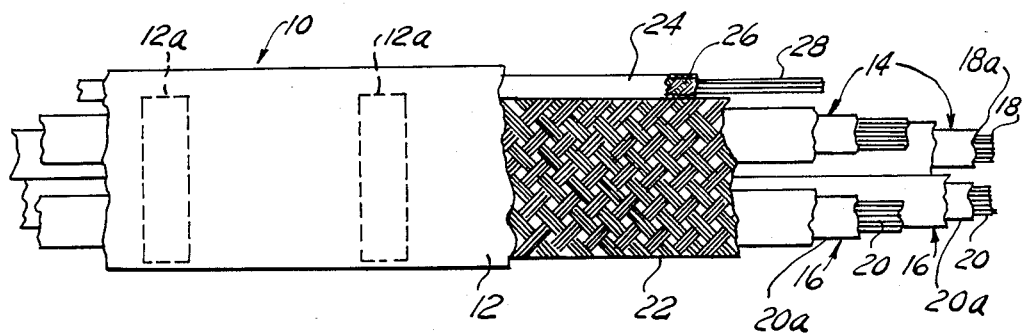
FIG. 1 is an elevational view with parts broken away illustrating the construction and the several components of the cable.

FIG. 1 shows a cable 10 which includes an external jacket or sleeve 12 made of a heavy vinyl or like insulating material. The cable of FIG. 1 includes a provision for two plus and two minus leads identified by the numerals 14 for the plus leads and 16 for the minus leads. The leads 14 include a large number of individual conductors such as copper wire 18 and in a like manner the minus power leads 16 include multiple individual copper conductors 20. A separate non-conductive sleeve 18a surrounds each of the plus conducting leads 14 while a similar sleeve 20a encloses each group of minus leads 16. All of the power leads either two or four in number depending on the particular set up (multiple or single machine tool) are encased within a braided shield 22 that extends the entire length of the cable 10 between the power supply 30 and machine tool 32 as will better be shown in FIG. 2 hereinafter.

Also included tightly held within the outer jacket 12 there is a separate insulating sleeve 24 and braided shield 26 which respectively enclose a plurality of sensing leads 28 which preferably are assembled in twisted pair configuration. It will be understood that the outer shield 22 is typically grounded on the power supply 30 as shown in FIG. 2 while the braided shield 26 is grounded to the circuit ground on the associated printed circuit board in the power supply 30.

Figure 2:
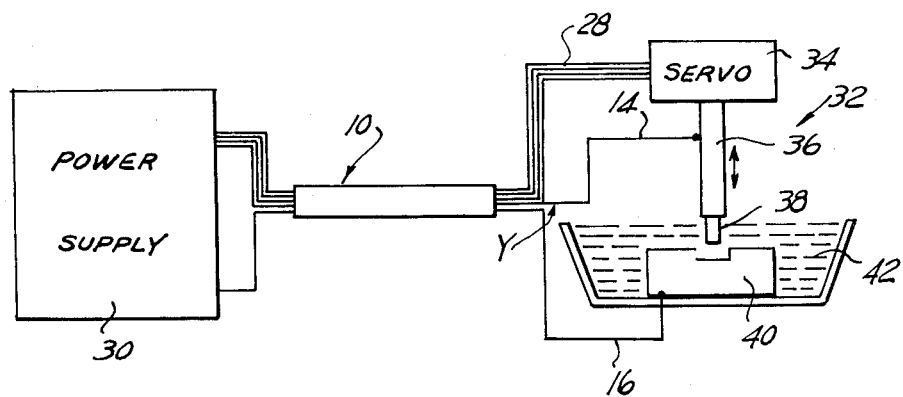
FIG. 2 is a schematic, partly block diagrammatic view of an EDM assembly showing the general connecting arrangement of the cable parts.

FIG. 2 shows a general arrangement of power supply 30 and machine tool 32. The power supply 30 is usually incorporated as a semi-conductor type pulse generator capable of operation over a very wide range going from very low for roughing to very high for finishing. The end portion of plus and minus leads 14 and 16 are individually wrapped in extensions of braid 22 from the "Y" junction indicated by the letter Y to the machine tool 32. As best shown in FIG. 2, the machine tool 32 includes a servo motor 34 to provide up and down movement of a ram 36 on which is mounted an electrode tool 38. As the machining operation progresses, the electrode tool 38 is fed down toward the workpiece 40.

FIG. 2 also illustrates the manner in which the sensing leads that are related to the servo feed operation are coupled to it. The power leads, in this case two in number, are indicated as the minus power lead 16 and a plus power lead 14, connected to the electrode 38 and workpiece 40, respectively. A dielectric fluid 42 is used to fill the gap between the electrode tool 38 and the workpiece 40. As shown in FIG. 2 the lead length of the power leads is maintained substantially equal as closely as possible over the entire distance between the power supply 30 and the machine tool 32. The shielded arrangement of the braided shield 22 is likewise continued from the Y connection over the entire length of the plus and minus conductors leads 20 and 18.

An important feature of the invention is the manner in which the power leads are tightly held in a substantially constant spatial relationship throughout the length of the cable 10 by the tight external jacket 12. As one option, it is possible to include spaced additional tight bands 12a along the length of the cable 10 to even more tightly bind the power leads 14 and 16 together in spaced relationship. This option is indicated in dotted lines in FIG. 1.

It will thus be seen that we have provided by our invention a greatly improved cable arrangemment of an electrical discharge machining assembly. The employment of the cable has greatly improved the stability of cutting and reduced the line impedance thus making the EDM operation much more controllable and efficient.

We claim:

1. An electric discharge machining apparatus comprising a power supply with two terminals, a power and sensing cable and a machine tool, said machine tool including an electrode tool and workpiece, wherein thhe cable comprises:

a pair of substantially equal length power conducting leads, one of said pair connected between one of said terminals and the electrode tool, the other of said pair connected between the other of said terminals and the workpiece;

each of said leads including a non-conductive sleeve and a plurality of individual conductors inside such sleeve;

a single braided shield sleeve enclosing both of said power conducting leads;

an external insulating jacket enclosing said braided shield sleeve;

a plurality of sensing and control leads and a braided shield enclosing such leads; and a separate insulating sleeve enclosing said braided shield of said sensing leads and aligned substantially parallel to said power leads intermediate their respective braided shield and said external insulating jacket, said braided shield sleeve enclosing said power conducting leads grounded to said power supply.

2. The improvement of claim 1 wherein a plurality of spaced resilient bands are mounted about said power leads for retaining them in substantially constant spaced relationship throughout the length of the cable.

3. The improvement of claim 1 wherein said sensing and control leads are mounted inside their respective shield in twisted relationships.

4. The improvement of claim 1 wherein at least two pairs of said power conducting leads are included inside said external jacket and likewise maintained in substantially equal spatial relationship one relative to the other.

* * * * *